United States Patent Office 3,032,498
Patented May 1, 1962

3,032,498
DRILLING FLUID
Harry M. Walker, Dickinson, Tex., assignor to Monsanto Chemical Company, St. Louis, Mo., a corporation of Delaware
No Drawing. Filed Jan. 4, 1954, Ser. No. 402,131
4 Claims. (Cl. 252—8.5)

This invention relates to a drilling mud such as is employed in the rotary drilling of oil and gas wells. More particularly, it relates to a drilling mud which has improved properties for preventing or reducing loss of fluid from the well bore into the surrounding formations.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud, is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump presures and/or power consumption. The drilling mud must also be sufficiently thixotropic, i.e., have sufficient gel strength, to prevent settling of solids from the mud when circulation is stopped, but, at the same time, must readily release the cuttings from suspension when the mud is agitated as in the settling pits.

Of prime importance is the so-called water-loss or wall-building characteristic of the mud. A good mud deposits a thin, tough impermeable filter cake which prevents mud fluid from being lost to the formation by pressure filtration. When large amounts of water filter from the mud into the formation surrounding the borehole, the solid contents of the mud build up a thick filter cake on the walls of the hole. If this filter cake becomes thick enough, it may restrict the size of the annular passage, or slough off and cause jamming of the bit. In addition, other difficulties are caused by high water loss. Fluid lost to the formation may cause hydration of formation shales resulting in swelling or heaving of the formation. Water lost to the formation may also result in plugging or "water-blocking" of oil-bearing sands.

Considerable work has been done in an attempt to develop additive agents for drilling muds to impart these desirable properties of viscosity, gel strength, and filtration characteristics thereto. This is particularly true with regard to filtration rate or water loss. In order to prevent such loss, it has been the usual practice to add to the mud chemical agents such as sulfonated rubber, hydrolyzed polyacrylonitrile, polyalkyl aryl sulfonates, starch and starch derivatives, various celluloses, and the like. While these additives function effectively as water-loss reducers, it has been found that they themselves often impart other undesirable properties to the drilling muds in which they are incorporated. For example, some of the above-mentioned additives, such as hydrolyzed polyacrylonitrile, increase viscosity beyond the satisfactory limits and adversely affect gel strength. Some starches are objectionable because they ferment, thus making them less desirable for this use.

It is, therefore, an object of the present invention to provide an aqueous dispersion or suspension of finely divided solid materials which has little tendency to lose water by filtration therefrom.

Another object of the invention is to provide an improved water-base drilling mud having a low filtration rate suitable for use in rotary drilling of boreholes into subsurface formations.

A still further object of the invention is to provide an agent which, on addition to a drilling mud, will substantially reduce the loss of water therefrom without adversely affecting either the viscosity of the mud or its ability to maintain solids in suspension.

It is still another object of the invention to provide an improved method of drilling oil or gas wells in which the water-base drilling mud herein described is employed.

Other objects and advantages will become apparent to those skilled in the art from the following description and appended claims.

These objects may be accomplished according to the present invention by incorporating in the water-base drilling mud a sufficient amount of cyanoethylated starch to reduce the tendency of said drilling mud to lose water by filtration. The composition of the present invention may be described briefly as a mixture comprising finely divided solid material, an aqueous vehicle in which the solid material is dispersed or suspended, and a sufficient amount of cyanoethylated starch to reduce the loss of water from the mixture by filtration.

The finely divided solid material of the invention may, of course, be any finely divided solid which is capable of being dispersed or susperded in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting materials added to increase specific gravity such as barytes, iron oxide, calcium carbonate, silica and the like may also be included.

The aqueous medium may be fresh water such as obtained from wells or streams, or it may be oil-in-water emulsions, i.e., fresh water which has become contaminated in some way with small quantities of oil, or to which such oil has been added to gain some desired advantage.

It is contemplated that the drilling muds of the invention may also contain other additives besides the cyanoethylated starch. Materials such as caustic, quebracho, lime, cement, gypsum and the like may be added to the drilling mud at the surface or may be encountered in subsurface formations during drilling operations.

The cyanoethyl starch useful in the invention is readily prepared by reacting starch and acrylonitrile in the presence of a dilute solution of a strongly alkaline catalyst such as an alkali metal hydroxide or a strong organic base like tetraethyl ammonium hydroxide, for example. A cyanoethylated starch typical of that suitable for employment as a drilling mud additive may be prepared as follows:

Approximately 100 g. (0.617 mole) of starch, 6 g. (0.15 mole) of powdered sodium hydroxide, and 106 g. (2.0 moles) of acrylonitrile is stirred and refluxed in 450 ml. of dry dioxane for 2½ hrs. The mixture is filtered and the product is washed several times with acetone. It is then dried in the oven at 95–100° C. The nitrogen content (10.2%) of such a cyanoethylated starch corresponds to approximately 1.95 cyanoethyl groups per glucose unit. Depending upon the conditions employed, time of reaction, etc., the starch may contain varying quantities of nitrogen up to the theoretical value of 13%.

The quantities of the cyanoethylated starch to be employed in the drilling mud of the invention will vary with circumstances over a reasonably wide range and the amount employed in a specific suspension or dispersion will depend upon these circumstances and the characteristics of the material treated. Ordinarily, satisfactory results will be obtained with quantities ranging between 1 and 4 pounds per 42-gallon barrel of drilling mud. For optimum reduction in filtration rate with certain drilling muds, however, quantities up to 6 lbs. or more per 42-gallon barrel may be required. On the other hand, in some cases where only small improvement in water loss is needed, as little as 0.5 pound per barrel of the additive will produce the desired filtration rate.

When employed in accordance with the invention, the cyanoethylated starch may be added directly to the drilling mud as a dry powder, as a slurry suspended in a suitable liquid, or as a solution in water or some other suitable solvent, and it may be incorporated therein at any convenient point in the mud circulation system. It may be desirable to employ a mixing device, such as a cone and jet mixer or the equivalent, for incorporating the additive in the mud.

The following examples are presented to particularly illustrate the invention but they are not intended to limit it in any way except as it is limited in the appended claims.

EXAMPLE I

A typical so-called lime-base drilling mud containing about 35% solids was prepared by dispersing clay in water and adding thereto approximately 5 lbs. of lime, 3 lbs. of calcium lignosulfonate, and one lb. of sodium hydroxide per barrel of mud made. The clay on a dry basis consisted of 10 parts by weight of Tennessee Ball clay, 4 parts by weight of Dixie Bond clay, and 1 part by weight of bentonite (Baroid's "Aquagel"). The pH of the drilling fluid thus prepared was in the range from 12.5 to 13.5.

Portions of this mud both alone and in combination with specific amounts of cyanoethylated starch prepared as described above and containing 3.2% nitrogen, which is equivalent to 0.42 cyanoethyl groups per glucose unit, were tested to determine the effectiveness of the cyanoethylated starch additive as a water-loss reducer. The standard procedures given in "Recommended Practice for Standard Field Procedure for Testing Drilling Fluids" of the American Petroleum Institute, Third Edition, May 1950, were employed. Results of these tests are presented in Table I.

Table I

| Cyanoethylated Starch Added (lb. per 42-gal. bbl.) | Viscosity at 600 r.p.m. Stormer (cps.) | Filtration Rate (cc. in 30 min. A.P.I.) |
| --- | --- | --- |
| 0.0 | 9.5 | 39 |
| 0.5 | 11.0 | 32 |
| 1.0 | 14.5 | 26.5 |
| 2.0 | 11.0 | 22 |
| 4.0 | 17.5 | 13.5 |
| 6.0 | 16.0 | 8.5 |

EXAMPLE II

The tests of Example I were repeated using as an additive another sample of cyanoethylated starch containing 2.5% nitrogen or 0.33 cyanoethyl groups per glucose unit. Results of these tests are presented in Table II.

Table II

| Cyanoethylated Starch Added (lb. per 42-gal. bbl.) | Viscosity at 600 r.p.m. Stormer (cps.) | Filtration Rate (cc. in 30 min. A.P.I.) |
| --- | --- | --- |
| 0.0 | 9.5 | 39.0 |
| 0.5 | 16.0 | 27.0 |
| 1.0 | 17.5 | 25.0 |
| 2.0 | 12.5 | 18.5 |
| 4.0 | 21.5 | 10.0 |
| 6.0 | 28.0 | 5.5 |

EXAMPLE III

Still another sample of cyanoethylated starch, this one containing 4.83% nitrogen (0.68 cyanoethyl groups per glucose unit), was tested as in Examples I and II above. The results obtained are recorded in Table III.

Table III

| Cyanoethylated Starch Added (lb. per 42-gal. bbl.) | Viscosity at 600 r.p.m. Stormer (cps.) | Filtration Rate (cc. in 30 min. A.P.I.) |
| --- | --- | --- |
| 0.0 | 9.5 | 40 |
| 0.5 | 13.0 | 37.5 |
| 1.0 | 20.5 | 26.5 |
| 2.0 | 13.0 | 20.0 |
| 4.0 | 16.0 | 10.0 |
| 6.0 | 33.0 | 6.0 |

It is readily apparent from these results that the addition of cyanoethylated starch to drilling mud will effectively reduce water-loss or filtration rate to a significant extent without also adversely affecting the viscosity of the drilling fluid.

EXAMPLE IV

An added advantage of the drilling mud composition of the invention is its stability when subjected to high temperatures. Since bottom-hole temperatures as high as 300° F. are encountered during drilling operations, it is important that the drilling mud employed does not suffer any loss in effectiveness nor have any significant effect on viscosity and gel strength values at these higher temperatures. Samples of the drilling mud used in Example III containing 2 lb. of cyanoethylated starch and 6 lb. of cyanoethylated starch respectively per 42-gal. barrel of mud were retested after being subjected for 72 hr. to a temperature of 250° F. The results of such tests along with the results obtained in Example III before heating are presented in Table IV below.

Table IV

| Cyanoethylated Starch Added (lb. per 42-gal. bbl.) | Before Heating | | After Heating | |
| --- | --- | --- | --- | --- |
| | Viscosity at 600 r.p.m. Stormer (cps.) | Filtration Rate (cc. in 30 min. A.P.I.) | Viscosity at 600 r.p.m. Stormer (cps.) | Filtration Rate (cc. in 30 min. A.P.I.) |
| 0.0 | 9.5 | 40.0 | 33 | 42 |
| 2.0 | 13.0 | 20.0 | 42 | 25 |
| 6.0 | 33.0 | 6.0 | 63.5 | 10.5 |

These results demonstrate that cyanoethylated starch still reduces water loss in the same order of magnitude after subjection to high temperatures and that the viscosity of the drilling fluid containing this additive still remains within the satisfactory range after such heating.

Drilling muds containing the cyanoethylated starch of this invention are particularly valuable in that they promote the formation of a thin filter cake on the walls of the borehole, said filter cake being substantially impervious to water with the result that the porous formations through which the drill passes do not absorb water from the mud. This filter cake is an aid in maintaining the quality of the mud, preventing swelling or heaving of the earth formation, etc. The cyanoethylated starch of the invention is resistant to bacterial decomposition, does not materially affect the viscosity of the drilling muds when used in quantities which are efficient in building up the filter cake, and is relatively stable when subjected to the high temperatures ordinarily encountered in drilling operations.

What is claimed is:

1. A water-base drilling mud comprising an aqueous fluid mixture containing suspended finely divided inorganic solid materials which form a filter cake on the wall of the well and a water-soluble cyanoethylated starch in an amount sufficient to reduce the water loss due to filtration through said filter cake without increasing the viscosity of said drilling mud to such an extent that it cannot be circulated.

2. A water-base drilling mud comprising in combination sufficient water to maintain the mud as a fluid, sufficient clayey material to form a filter cake on the wall of the well, and a water-soluble cyanoethylated starch in an amount sufficient to reduce the water loss due to filtration through said filter cake without increasing the viscosity of said drilling mud to such an extent that it cannot be circulated.

3. In a process for drilling a well with well-drilling tools wherein there is circulated in the well a water-base drilling mud containing clayey materials capable of forming colloidal dispersions whereby a filter cake is deposited on the wall of said well to decrease the loss of fluid from said drilling mud into surrounding earthen formations the method which comprises incorporating in said drilling mud a water-soluble cyanoethyl ether of starch in an amount sufficient to lower the fluid loss through said filter cake but insufficient to increase the viscosity of said mud to the extent that it cannot be circulated and contacting said wall of said well with the resulting drilling mud to form said filter cake thereon.

4. In a process for drilling a well with well-drilling tools wherein there is circulated in the well a water-base drilling mud containing clayey materials capable of forming colloidal dispersions whereby a filter cake is deposited on the wall of said well to decrease the loss of fluid from said drilling mud into surrounding earthen formations the method which comprises incorporating in said drilling mud a water-soluble cyanoethyl ether of starch in an amount in the range from about 0.5 lb. to 6 lb. per 42-gallon barrel of said drilling mud and contacting said wall of said well with the resulting drilling mud to form said filter cake thereon.

References Cited in the file of this patent

UNITED STATES PATENTS

| | | |
|---|---|---|
| 2,316,129 | Bock | Apr. 6, 1943 |
| 2,561,418 | Ryan | July 24, 1951 |
| 2,670,329 | Jones | Feb. 23, 1954 |
| 2,718,497 | Oldham | Sept. 20, 1955 |

OTHER REFERENCES

Noller: Chemistry of Organic Compounds, 1951, pages 240, 241, 247.